(12) United States Patent
Gu et al.

(10) Patent No.: US 11,466,121 B2
(45) Date of Patent: Oct. 11, 2022

(54) BIOABSORBABLE RESIN FOR ADDITIVE MANUFACTURING

(71) Applicant: Carbon, Inc., Redwood City, CA (US)

(72) Inventors: Xinyu Gu, Shanghai (CN); Sharon Chen, Fremont, CA (US); Gina Michelle Policastro, San Francisco, CA (US); Peyton Hopson, Jacksonville, FL (US); Jackie Donners, Pennington, NJ (US); Michael Vendely, Cincinnati, OH (US); Jason L. Harris, Cincinnati, OH (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 17/753,415

(22) PCT Filed: Sep. 16, 2020

(86) PCT No.: PCT/US2020/051047
§ 371 (c)(1),
(2) Date: Mar. 2, 2022

(87) PCT Pub. No.: WO2021/055458
PCT Pub. Date: Mar. 25, 2021

(65) Prior Publication Data
US 2022/0267513 A1 Aug. 25, 2022

Related U.S. Application Data

(60) Provisional application No. 62/900,708, filed on Sep. 16, 2019, provisional application No. 62/913,227, filed on Oct. 10, 2019, provisional application No. 63/073,021, filed on Sep. 1, 2020.

(51) Int. Cl.

| | | |
|---|---|---|
| B29C 35/08 | (2006.01) |
| C08F 2/46 | (2006.01) |
| C08F 2/50 | (2006.01) |
| C08G 61/04 | (2006.01) |
| C08G 63/08 | (2006.01) |
| B33Y 10/00 | (2015.01) |
| B33Y 70/00 | (2020.01) |
| B33Y 40/20 | (2020.01) |
| B29C 64/124 | (2017.01) |
| C08G 63/91 | (2006.01) |
| C08F 290/06 | (2006.01) |
| C08K 11/00 | (2006.01) |
| B29C 64/35 | (2017.01) |
| B29C 71/00 | (2006.01) |

(52) U.S. Cl.
CPC ............ *C08G 63/08* (2013.01); *B29C 64/124* (2017.08); *B29C 64/35* (2017.08); *B33Y 10/00* (2014.12); *B33Y 40/20* (2020.01); *B33Y 70/00* (2014.12); *C08F 290/061* (2013.01); *C08G 63/912* (2013.01); *C08K 11/00* (2013.01); *B29C 2071/0027* (2013.01); *B29K 2995/006* (2013.01)

(58) Field of Classification Search
CPC ... C08F 2/48; C08F 2/50; C08G 61/04; B29C 35/04
USPC ........ 264/401; 522/189, 184, 71, 6, 1; 520/1
See application file for complete search history.

(56) References Cited

U.S. PATENT DOCUMENTS

| | | |
|---|---|---|
| 3,213,058 A | 10/1965 | Boyle et al. |
| 5,236,637 A | 8/1993 | Hull |
| 5,391,072 A | 2/1995 | Lawton et al. |
| 5,529,473 A | 6/1996 | Lawton et al. |
| 6,916,867 B2 | 7/2005 | Gugumus |
| 7,157,586 B2 | 1/2007 | Wood et al. |
| 7,438,846 B2 | 10/2008 | John |
| 7,695,643 B2 | 4/2010 | Fritzsche et al. |
| 7,892,474 B2 | 2/2011 | Shkolnik et al. |
| 8,110,135 B2 | 2/2012 | El-Siblani |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,453,142 B2 | 9/2016 | Rolland et al. |
| 9,770,241 B2 | 9/2017 | Rousseau et al. |
| 9,873,790 B1 | 1/2018 | Andjelic et al. |
| 10,085,745 B2 | 10/2018 | Dalessandro et al. |
| 10,149,753 B2 | 12/2018 | Chen et al. |
| 10,975,224 B2 | 4/2021 | Yamada et al. |
| 11,020,947 B2 | 6/2021 | Lim et al. |

(Continued)

FOREIGN PATENT DOCUMENTS

| | | |
|---|---|---|
| WO | 2006055940 A2 | 5/2006 |
| WO | 2019195763 A1 | 10/2019 |
| WO | 2021055458 A1 | 3/2021 |

OTHER PUBLICATIONS

International Search Report and Written Opinion corresponding to PCT/ US2020/051047; dated Jan. 14, 2021 (8 pages).

(Continued)

*Primary Examiner* — Jessica Whiteley
(74) *Attorney, Agent, or Firm* — Myers Bigel, P.A.

(57) ABSTRACT

Provided herein according to aspects of the present invention are resins that: (a) are suitable for use in additive manufacturing techniques such as bottom-up and top-down stereolithography, (b) produce objects that are bioresorbable, and (c) produce objects that are flexible or elastic (preferably at at least typical room temperatures of 25° C., and in some embodiments at typical human body temperatures of 37° C.). Such resins may include: (a) a bioresorbable polyester oligomer having reactive end groups; (b) non-reactive diluent; (c) optionally reactive diluent; and (d) a photoinitiator.

23 Claims, No Drawings

(56) References Cited

U.S. PATENT DOCUMENTS

| | | |
|---|---|---|
| 11,027,312 B2 | 6/2021 | Hinzmann et al. |
| 11,029,541 B2 | 6/2021 | Chiu et al. |
| 2009/0004243 A1 | 1/2009 | Pacetti et al. |
| 2013/0292862 A1 | 11/2013 | Joyce |
| 2013/0295212 A1 | 11/2013 | Chen et al. |
| 2015/0331402 A1 | 11/2015 | Lin et al. |
| 2015/0360419 A1 | 12/2015 | Willis et al. |
| 2016/0288376 A1 | 10/2016 | Sun et al. |
| 2017/0129167 A1 | 5/2017 | Castanon |
| 2017/0129169 A1 | 5/2017 | Batchelder et al. |
| 2017/0355815 A1 | 12/2017 | Becker et al. |
| 2018/0126630 A1 | 5/2018 | Panzer et al. |
| 2018/0243976 A1* | 8/2018 | Feller .................... B33Y 10/00 |
| 2018/0290374 A1 | 10/2018 | Willis et al. |
| 2019/0240385 A1 | 8/2019 | Hartwell et al. |
| 2019/0269817 A1 | 9/2019 | Williams et al. |
| 2021/0077094 A1 | 3/2021 | Harris et al. |
| 2021/0077095 A1 | 3/2021 | Harris et al. |
| 2021/0077096 A1 | 3/2021 | Harris et al. |
| 2021/0077097 A1 | 3/2021 | Harris et al. |
| 2021/0077098 A1 | 3/2021 | Harris et al. |
| 2021/0077103 A1 | 3/2021 | Harris et al. |
| 2021/0077104 A1 | 3/2021 | Harris et al. |
| 2021/0077105 A1 | 3/2021 | Harris et al. |
| 2021/0077106 A1 | 3/2021 | Harris et al. |
| 2021/0077107 A1 | 3/2021 | Harris et al. |
| 2021/0077108 A1 | 3/2021 | Harris et al. |
| 2021/0077109 A1 | 3/2021 | Harris et al. |

OTHER PUBLICATIONS

Elomaa, Laura, et al., "Preparation of poly(ε-caprolactone)-based tissue engineering scaffolds by stereolithography", Acta Biomaterialia, 7(11), 2011, 3850-3856.

Januszewicz, Rima, et al., "Layerless fabrication with continuous liquid interface production", PNAS, 113, 2016, 11703-11708.

Melchels, Ferry P.W., et al., "Effects of the architecture of tissue engineering scaffolds on cell seeding and culturing", Acta Biomaterialia, 6(11), 2010, 4208-4217.

Tumbleston, John R., et al., "Continuous liquid interface production of 3D Objects", Science, 347(6228), 2015, 1349-1352.

Gauss, Paul, et al., "Advanced additives for radical photopolymerization", Technical University of Vienna, Ph.D. Thesis Dissertation, 2019, (221 pages).

Gauss, Paul, et al., "α-Ketoesters as Nonaromatic Photoinitiators for Radical Polymerization of (Meth)acrylates", Macromolecules, 52(7), 2019, 2814-2821.

Hosoyama, Katsuhiro, et al., "Peptide-Based Functional Biomaterials for Soft-Tissue Repair", Frontiers in Bioengineering and Biotechnology, 7(Article 205), 2019, 1-19.

\* cited by examiner

BIOABSORBABLE RESIN FOR ADDITIVE MANUFACTURING

CROSS REFERENCE TO RELATED APPLICATIONS

This application is a 35 U.S.C. § 371 national phase application of International Application Serial No. PCT/US2020/051047, filed Sep. 16, 2020, which claims priority from and the benefit of U.S. Provisional Application Ser. Nos. 62/900,708, 62/913,227, and 63/073,021, filed Sep. 16, 2019, Oct. 10, 2019, and Sep. 1, 2020, respectively, the disclosures of which are hereby incorporated herein in their entireties.

BACKGROUND

Resins for the production of bioresorbable objects are known and described in, for example, U.S. Pat. Nos. 9,770,241; 10,085,745; 10,149,753; and 9,873,790; and in US Patent App. Pub. No. 2017/0355815. However, not all such resins are well-suited for use in additive manufacturing techniques such as stereolithography due to the sometimes competing needs for (a) printability in the additive manufacturing process (e.g., sufficiently low viscosity), (b) flexible or elastic mechanical properties in the object produced, and (c) reasonable bioabsorption/biodegradation times.

In one prior work, a polycaprolactone dimethacrylate based resin was investigated for printing a bioresorbable porous scaffold with stereolithography (Elomaa et al., Preparation of poly(e-caprolactone)-based tissue engineering scaffolds by stereolithography, *Acta Biomaterialia* 7, 3850-3856 (2011)). Although the mechanical properties of Elomaa et al.'s resin are useful for some implantable objects, their degradation time (generally greater than 2 years) is slower than preferred.

In another prior reference, a poly(D,L-lactide) dimethacrylate based resin was investigated (Melchels et al., Effects of the architecture of tissue engineering scaffolds on cell seeding and culturing, *Acta Biomaterialia* 6 4208-4217 (2010)). However, the Melchels et al. cured resin is rigid and non-elastic, which is less preferred for production of some implantable (or other biomedical) objects that undergo large elastic deformation during implant and/or use.

Accordingly, there remains a need for new additive manufacturing resins suitable for biomedical applications.

SUMMARY

A first aspect of the present disclosure is a resin useful for producing objects. The resins (a) are suitable for use in additive manufacturing techniques such as bottom-up and top-down stereolithography, (b) produce objects that are bioresorbable, and (c) produce objects that are flexible or elastic (preferably at at least typical room temperatures of 25° C., and in some embodiments at typical human body temperatures of 37° C.). Such resins typically include: (a) a bioresorbable polyester oligomer having reactive end groups; (b) non-reactive diluent; (c) optionally reactive diluent; and (d) a photoinitiator.

In some aspects, the resin comprises or consists essentially of: (a) from 5 or 10 percent by weight to 80 or 90 percent by weight of (meth)acrylate terminated bioresorbable polyester oligomer; (b) from 1 or 5 percent by weight to 50 or 70 percent by weight of non-reactive diluent; (c) from 0.1 or 0.2 percent by weight to 2 or 4 percent by weight of photoinitiator; (d) optionally, from 1 or 5 percent by weight to 40 or 50 percent by weight of reactive diluent; (e) optionally, from 1 or 2 percent by weight to 40 or 50 percent by weight of filler; and (f) optionally, from 1 or 2 percent by weight to 5 or 10 percent by weight of at least one additional cross-linking agent, such as trimethylolpropane trimethacrylate (TMPTMA).

In some aspects, the oligomer may include a linear oligomer and/or a branched oligomer (i.e., a star oligomer, such as a tri-arm oligomer).

The oligomer according to some aspects may comprise degradable ester linkages between constituents selected from caprolactone, lactide, glycolide, trimethylene carbonate, dioxanone, and propylene fumarate monomers in an ABA block, BAB block, CBC block, BCB block, AB random composition, BC random composition, homopolymer, or any combination thereof, wherein: A=poly(lactide) (PLA), poly(glycolide) (PGA), poly(lactide-co-glycolide) (PLGA), or polypropylene fumarate (PPF), B=polycaprolactone (PCL), polytrimethylene carbonate (PTMC), or poly(caprolactone-co-lactide) (PCLLA), and C=polydioxanone (PDX).

In some aspects the oligomer has a molecular weight of from 2 or 5 kilodaltons to 6, 10, 15 or 20 kilodaltons.

In some aspects the oligomer comprises an ABA block, a BAB block, a CBC block, or a BCB block in linear and/or branched (e.g., star or tri-arm) form.

In some aspects A is: (i) poly(lactide); (ii) poly(glycolide); (iii) poly(lactide-co-glycolide) containing lactide and glycolide in a molar ratio of (i) from 90:10 to 55:45 lactide:glycolide (i.e., a lactide rich ratio) or (ii) from 45:55 to 10:90 lactide:glycolide (i.e., a glycolide rich ratio); or any combination of the foregoing.

In some aspects B is: (i) polycaprolactone; (ii) polytrimethylene carbonate; (iii) poly(caprolactone-co-lactide) containing caprolactone and lactide in a molar ratio of 95:5 to 5:95 caprolactone:lactide; or any combination of the foregoing;

In some aspects A (PLA, PGA, PLGA, PPF, or a combination thereof) has a molecular weight of from 1,000 or 2,000 daltons, up to 4,000, 6,000 or 10,000 daltons; and/or B (PCL, PTMC, PCLLA, or a combination thereof) has a molecular weight (Mn) of from 1,000 or 1,600 daltons, up to 4,000, 6,000 or 10,000 daltons.

In some aspects the non-reactive diluent is selected from the group consisting of dimethylformamide, dimethylacetamide, N-methyl pyrrolidone (NMP), dimethyl sulfoxide, cyclic carbonate (such as propylene carbonate), diethyl adipate, methyl ether ketone, ethyl alcohol, acetone, and combinations thereof. In some aspects the non-reactive diluent is propylene carbonate.

In some aspects the reactive diluent comprises an acrylate, a methacrylate, a styrene, a vinylamide, a vinyl ether, a vinyl ester, polymers containing any one or more of the foregoing, or a combination of two or more of the foregoing.

In some aspects the resin further includes at least one additional ingredient selected from: pigments, dyes, active compounds or pharmaceutical compounds, and detectable compounds (e.g., fluorescent, phosphorescent, radioactive), and combinations thereof.

In some aspects the resin further includes a filler (e.g., bioresorbable polyester particles, sodium chloride particles, calcium triphosphate particles, sugar particles).

In some aspects the resin consists essentially of: (a) from 5 or 10 percent by weight to 80 or 90 percent by weight of a (meth)acrylate terminated, linear or branched, bioresorbable polyester oligomer of monomers in an ABA block, a BAB block, a CBC block, or a BCB block, wherein: A is poly(lactide) (PLA), poly(glycolide) (PGA), poly(lactide-co-glycolide) (PLGA), or a combination thereof, with said PLGA containing lactide and glycolide in a molar ratio of either 90:10 to 60:40 lactide:glycolide (i.e., a lactide rich ratio) or 40:60 to 10:90 lactide:glycolide (i.e., a glycolide rich ratio), and A has a molecular weight (Mn) of from 1,000 or 2,000 daltons, up to 4,000 or 10,000 daltons); B is polycaprolactone (PCL, PTMC, PCLLA) and has a molecular weight (Mn) of from 1,000 or 1,600 daltons, up to 4,000 or 10,000 daltons; and C is polydioxanone (PDX) and has a molecular weight (Mn) of from 1,000 or 2,000 daltons, up to 4,000 or 10,000 daltons) and (b) from 1 or 5 percent by weight to 50 or 70 percent by weight of propylene carbonate; (c) from 0.1 or 0.2 percent by weight to 2 or 4 percent by weight of photoinitiator, (d) optionally, from 1 or 5 percent by weight to 40 or 50 percent by weight of reactive diluent; and (e) optionally, from 1 or 2 percent by weight to 40 or 50 percent by weight of filler.

In some aspects the resin consists essentially of: (a) from 10 percent by weight to 80 percent by weight of (meth)acrylate terminated, bioresorbable, branched polyester oligomer; wherein said branched oligomer comprises degradable ester linkages between constituents in an ABA block, BAB block, or AB random composition, where A is poly(lactide) or poly(lactide-co-glycolide), B is polycaprolactone or poly(caprolactone-co-lactide), and said oligomer has a molecular weight (Mn) of from 2 to 6 kilodaltons; (b) from 5 percent by weight to 50 percent by weight of non-reactive diluent selected from the group consisting of N-methyl pyrrolidone (NMP) and propylene carbonate; (c) from 0.2 percent by weight to 2 percent by weight of photoinitiator; (d) optionally, from 1 percent by weight to 50 percent by weight of reactive diluent; (e) optionally, from 1 percent by weight to 50 percent by weight of filler; and (t) optionally, from 1 percent by weight to 10 percent by weight of additional crosslinking agent.

Also provided is a method of making a flexible or elastic bioresorbable object, comprising producing said object by photopolymerizing a resin as taught herein in the shape of the object (e.g., by additive manufacturing, such as by bottom-up or top-down additive manufacturing).

In some aspects the method further comprises cleaning said object (e.g., by washing, wiping, spinning, etc.) after said producing step (but preferably before said step of exposing said object to additional light).

In some aspects the method further comprises exposing said object to additional light after said producing step to further react unpolymerized constituents therein.

In some aspects the method further comprises extracting residual diluent from said object after said producing step.

In some aspects the method further comprises drying said object (optionally but preferably under a vacuum) to remove extraction solvents therefrom.

In some aspects the method further comprises producing said object in enlarged form to offset shrinkage of said object that occurs during said extracting, further exposing, and/or cleaning steps, and drying steps.

Also provided is a flexible or elastic bioresorbable object produced by a method as taught herein.

Additional aspects of the present invention are explained in greater detail below.

DETAILED DESCRIPTION

The present invention is now described more fully hereinafter. This invention may, however, be embodied in many different forms and should not be construed as limited to the embodiments set forth herein; rather, these embodiments are provided so that this disclosure will be thorough and complete and will fully convey the scope of the invention to those skilled in the art.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations of one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly-used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

The transitional phrase "consisting essentially of" means that the scope of a claim is to be interpreted to encompass the specified materials or steps recited, and also additional materials or steps that do not materially affect the basic and novel characteristics of the claimed invention as described herein.

The disclosures of all patent references cited herein are to be incorporated herein by reference in their entirety.

1. Polymer Materials and Resins.

Resins useful for carrying out the present invention generally comprise, consist of, or consist essentially of:

(a) from 5 or 10 percent by weight to 80 or 90 percent by weight of (meth)acrylate terminated bioresorbable polyester oligomer;

(b) from 1 or 5 percent by weight to 50 or 70 percent by weight of non-reactive diluent;

(c) from 0.1 or 0.2 percent by weight to 2 or 4 percent by weight of photoinitiator;

(d) optionally, from 1 or 5 percent by weight to 40 or 50 percent by weight of reactive diluent;

(e) optionally, from 1 or 2 percent by weight to 40 or 50 percent by weight of filler; and (f) optionally, from 0.1 or 1 percent by weight to 10 or 20 percent by weight of additional ingredients such as an active agent, detectable group, pigment or dye, or the like.

Oligomer prepolymers for resins from which the polymers may be produced may be linear or branched (e.g., "star" oligomers such as tri-arm oligomers). Suitable end groups for such monomers or oligomer prepolymers include, but are not limited to, acrylate, methacrylate, fumarate, vinyl carbonate, methyl ester, ethyl ester, etc. Non-limiting examples of suitable resin compositions are given in Table 1 below (where constituents in each column can be combined with constituents of the other columns in any combination).

TABLE 1

| Backbone Chemistry | Reactive End Group | Oligomer Architecture | Plasticizer | Diluent | Photo-initiator |
|---|---|---|---|---|---|
| PLGA | Methacrylate | Linear | HO-PCL-OH | Mono-vinyl ether | Irgacure ® 2959 |
| PCL | Acrylate | Star (branching) | HO-PLGA-PCL-PLGA-OH | DEGMA | Irgacure ® TPO |
| PLGA-PCL-PLGA | Vinyl Carbonate | | | Vinyl acetate | ITX |
| PLGA-PEG-PLGA | Fatty acid methyl ester | | | n-butyl methacrylate | Irgacure ® 819 |
| PLGA-PCL | | | | Triacetine NMP DMSO divinyl adipate | |

PLGA = poly(lactic-co-glycolic acid); PEG = polyethylene glycol; PCL = polycaprolactone; DEGMA = Di(ethylene glycol) methyl ether methacrylate; TPO = diphenyl (2,4,6-trimethylbenzoyl) phosphine oxide; ITX = isopropylthioxanthone; NMP = N-methyl pyrrolidone; DMSO = dimethylsulfoxide.

A particular example of a composition for use in producing the objects described herein is based on a methacrylate terminated oligomer with a bioresorbable polyester linkage, which provides rubber-like elastic behavior at physiological temperatures, short-term retention of mechanical properties (in some embodiments, 1 month or less), and long-term full resorption (in some embodiments, over a time of approximately 4-6 months).

Bioresorbable polyester oligomers for use in some preferred embodiments are, in general, bioresorbable oligomers with methacrylate end-groups. Such oligomers are typically comprised of degradable ester linkages selected from caprolactone, lactide, glycolide, trimethylene carbonate, dioxanone, and propylene fumarate monomers in an ABA block, BAB block, CBC block, BCB block, AB random composition, BC random composition, homopolymer, or any combination thereof, where: A=poly(lactide) (PLA), poly(glycolide) (PGA), or poly(lactide-co-glycolide) (PLGA), polypropylene fumarate (PPF), B=polycaprolactone (PCL), polytrimethylene carbonate (PTMC), poly(caprolactone-co-lactide) (PCLLA) and C=polydioxanone (PDX). Copolymers may have a molecular weight (Mn) of from 2 or 5 kilodaltons to 6, 10, 15 or 20 kilodaltons, in either linear or star structure. Monomers used to produce such oligomers may optionally introduce branches, such as to enhance elasticity, as is known in the art, an example being gamma-methyl-epsilon caprolactone and gamma-ethyl-epsilon-caprolactone.

Lactides may be L-Lactides, D-Lactide, or mixtures thereof (i.e., D,L-Lactides). For PLA blocks, it is in some embodiments preferred to use L-Lactide, for better regularity and higher crystallinity.

In some embodiments, the oligomer comprises an ABA block, a BAB block, a CBC block, or a BCB block in linear and/or branched (e.g., star or tri-arm) form.

In some embodiments, A is: (i) poly(lactide); (ii) poly(glycolide); (iii) poly(lactide-co-glycolide) containing lactide and glycolide in a molar ratio of either 90:10 to 55:45 lactide:glycolide (i.e., a lactide rich ratio) or 45:55 to 10:90 lactide:glycolide (i.e., a glycolide rich ratio); or any combination thereof. In some embodiments, A D,L-Lactide mixture can be used for making the PLGA random copolymer.

In some embodiments, A (PLA, PGA, PLGA, PPF, or a combination thereof) has a molecular weight (Mn) of from 1,000 or 2,000 daltons, up to 4,000 or 10,000 daltons); and B (PCL, PTMC, and PCLLA) has a molecular weight (Mn) of from 1,000 or 1,600 daltons, up to 4,000 or 10,000 daltons.

In some embodiments, at least one additional cross-linking agent can be included (e.g., in an amount of from 1 or 2 percent by weight to 5 or 10 percent by weight). Any suitable additional cross-linking agents can be used, including bioabsorbable crosslinking agents, non-absorbable crosslinking agents, and combinations thereof. Examples of suitable bioabsorbable crosslinking agents include, but are not limited to, divinyl adipate (DVA), poly(caprolactone) trimethacrylate (PCLDMA, e.g., at a molecular weight Mn of about 950 to 2400 daltons), etc. Examples of suitable non-absorbable crosslinking agents include, but are not limited to, trimethylolpropane trimethacrylate (TMPTMA), poly(propylene glycol) dimethacrylate (PPGDMA), poly(ethylene glycol) dimethacrylate (PEGDMA), etc.

A particular embodiment is a resin consisting essentially of: (a) from 5 or 10 percent by weight to 80 or 90 percent by weight of a (meth)acrylate terminated, linear or branched, bioresorbable polyester oligomer of monomers in an ABA block, a BAB block, a CBC block, or a BCB block, wherein: A is poly(lactide) (PLA), poly(glycolide) (PGA), poly(lactide-co-glycolide) (PLGA), or a combination thereof, with said PLGA containing lactide and glycolide in a molar ratio of either 90:10 to 60:40 lactide:glycolide (i.e., a lactide rich ratio) or 40:60 to 10:90 lactide:glycolide (i.e., a glycolide rich ratio), and A has a molecular weight (Mn) of from 1,000 or 2,000 daltons, up to 4,000 or 10,000 daltons; B is polycaprolactone (PCL, PTMC, and PCLLA) and has a molecular weight (Mn) of from 1,000 or 1,600 daltons, up to 4,000 or 10,000 daltons; and C is polydioxanone (PDX) and has a molecular weight (Mn) of from 1,000 or 2,000 daltons, up to 4,000 or 10,000 daltons; (b) from 1 or 5 percent by weight to 50 or 70 percent by weight of propylene carbonate; (c) from 0.1 or 0.2 percent by weight to 2 or 4 percent by weight of photoinitiator, (d) optionally, from 1 or 5 percent by weight to 40 or 50 percent by weight of reactive diluent; and (e) optionally, from 1 or 2 percent by weight to 40 or 50 percent by weight of filler.

Non-reactive diluents that can be used in carrying out the invention include, but are not limited to, dimethylformamide, dimethylacetamide, N-methyl pyrrolidone (NMP), dimethyl sulfoxide, cyclic carbonate (for example, propylene carbonate), diethyl adipate, methyl ether ketone, ethyl alcohol, acetone, and combinations of two or more thereof.

Photoinitiators included in the polymerizable liquid (resin) can be any suitable photoiniator, including type I and type II photoinitiators and including commonly used UV photoinitiators, examples of which include but are not limited to acetophenones (diethoxyacetophenone for example), phosphine oxides such as diphenyl(2,4,6-trimethylbenzoyl) phosphine oxide, phenylbis(2,4,6-trimethylbenzoyl) phosphine oxide (PPO), Irgacure® 369, etc. See, e.g., U.S. Pat. No. 9,453,142 to Rolland et al.

Reactive diluents (including di and tri-functional reactive diluents) that can be used in carrying out the invention can include an acrylate, a methacrylate, a styrene, a vinylamide, a vinyl ether, a vinyl ester, polymers containing any one or more of the foregoing, and combinations of one or more of the foregoing (e.g., acrylonitrile, styrene, divinyl benzene, vinyl toluene, methyl acrylate, ethyl acrylate, butyl acrylate, methyl (meth)acrylate, isobornyl acrylate (IBOA), isobornyl methacrylate (IBOMA), an alkyl ether of mono-, di- or triethylene glycol acrylate or methacrylate, a fatty alcohol acrylate or methacrylate such as lauryl (meth)acrylate, and mixtures thereof).

The resin can have additional ingredients therein, including pigments, dyes, diluents, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Fillers. Any suitable filler may be used in connection with the present invention, including but not limited to bioresorbable polyester particles, sodium chloride particles, calcium triphosphate particles, sugar particles, etc.

Dyes/non-reactive light absorbers. In some embodiments, resins for carrying out the present invention include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, thioxanthone, hydroxyphenyltriazine, and/or benzotriazole ultraviolet light absorber (e.g., Mayzo BLS1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695,643, the disclosures of which are incorporated herein by reference.

2. Methods of Making.

Additive manufacturing. Suitable additive manufacturing apparatus and methods on which objects can be produced include bottom-up and top-down additive manufacturing methods and apparatus, as known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, US Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (2016). Other examples of methods and apparatus for carrying out particular embodiments of CLIP include, but are not limited to: Batchelder et al., US Patent Application Pub. No. US 2017/0129169; Sun and Lichkus, US Patent Application Pub. No. US 2016/0288376; Willis et al., US Patent Application Pub. No. US 2015/0360419; Lin et al., US Patent Application Pub. No. US 2015/0331402; D. Castanon, S Patent Application Pub. No. US 2017/0129167. B. Feller, US Pat App. Pub. No. US 2018/0243976; M. Panzer and J. Tumbleston, US Pat App Pub. No. US 2018/0126630; and K. Willis and B. Adzima, US Pat App Pub No. US 2018/0290374.

Post-production steps. After the additive manufacturing steps, additional post processing steps can include washing (e.g., in an organic solvent such as acetone, isopropanol, a glycol ether such as dipropylene glycol methyl ether or DPM), wiping (e.g., with an absorbent material, blowing with a compressed gas or air blade, etc.) centrifugal separation of residual resin, extraction of residual solvents, additional curing such as by flood exposure with ultraviolet light or the like, drying said object (optionally but preferably under a vacuum) to remove extraction solvents therefrom, and combinations of some or all of the foregoing, in accordance with known techniques.

3. Utility.

Resins as described herein are useful for making a variety of biomedical devices and medical aids, including implantable devices such as intravascular stents. Additional examples of objects that can be made with the resins described herein include, but are not limited to, those set forth in Williams et al., Surgical Mesh Implants containing polybutylene succinate) and copolymers thereof, US Patent Application Pub. No. 2019/0269817, (Sep. 5, 2019) and in Hartwell et al., Collapsible dressing for negative pressure wound treatment, US Patent Application Pub. No. 2019/0240385 (Aug. 8, 2019), the disclosures of which are incorporated by reference herein in their entirety.

The present invention is explained in greater detail in the following non-limiting Examples.

EXAMPLES 1-3

Preparation of a Difunctional Methacrylate (MA) Terminated Polyester Oligomer

These examples describe the preparation of a difunctional, methacrylate terminated, polyester oligomer. The midblock is PLGA-PCL-PLGA, the molecular weight is 6 kilodaltons, and PCL is included as 40 wt % of the total MW. PLGA is a random copolymer of lactide (L) and glycolide (G) with an L:G weight ratio of 1:1.

Refer to Table 2 for an example of the molar ratios and masses of each reagent used for a 1 kg batch of HO-PLGA-b-PCL-b-PLGA-OH synthesis as the next two sections are discussed.

TABLE 2

Example of molar ratios and mass of each reagent needed to synthesize a 1 kg batch of HO-PLGA-b-PCL-b-PLGA-OH.

| Reagent | Molecular Weight (g/mol) | Molar Ratio | Density (g/mol) | Mass (g) | Volume (mL) | Moles |
|---|---|---|---|---|---|---|
| Caprolactone (CL) | 114.14 | 22 | 1.03 | 400.0 | 388.4 | 3.50 |
| Diethylene glycol (DEG) | 106.12 | 1 | 1.12 | 16.9 | 15.1 | 0.16 |
| Stannous Octoate (Sn(Oct)) | 405.12 | $2.38 \times 10^{-3}$ | 1.25 | 0.15 | 0.12 | $3.81 \times 10^{-4}$ |
| D,L-Lactide (L) | 144.13 | 14 | — | 321.4 | — | 2.22 |
| Glycolide (G) | 116.07 | 14 | — | 258.8 | — | 2.22 |

EXAMPLE 1

HO-PCL-OH Synthesis

A round bottom flask was dried in a drying oven overnight and cooled under $N_2$ flow to room temperature. Caprolactone and tin octoate were added to the round bottom flask via a glass syringe and syringe needle. The reaction flask contents were heated to 130° C. Meanwhile, diethylene glycol was heated to 130° C. Once preheated, diethylene glycol was added to the reaction flask as an initiator and was allowed to react until complete monomer conversion. Monomer conversion was monitored using $H^1$ NMR. The reaction was stopped, and the reaction contents were allowed to cool to room temperature. The HO-PCL-OH was precipitated into cold MeOH from chloroform to obtain a white solid. $H^1$ NMR, DSC, FTIR, and THF GPC were used to characterize HO-PCL-OH.

EXAMPLE 2

HO-PLGA-b-PCL-b-PLGA-OH Synthesis

HO-PCL-OH and varying amounts of D,L-lactide and glycolide were added into a round-bottom flask under $N_2$ and heated to 140° C. to melt the reaction contents. After melting, the temperature was reduced to 120° C. and stannous octoate was added. The reaction continued with stirring while monitoring the monomer conversion with $H^1$ NMR and THF GPC. Once the reaction reaches the desired molecular weight, reaction contents were cooled to room temperature, dissolved in chloroform and precipitated into cold diethyl ether three times. The precipitate was dried under vacuum.

EXAMPLE 3

MA-PLGA-b-PCL-b-PLGA-MA Synthesis

Refer to Table 3 for an example of the molar ratio and masses of each reagent used to synthesize a 1 kg batch of MA-PLGA-b-PCL-b-PLGA-MA.

TABLE 3

Example of molar ratios and mass of each reagent needed to synthesize a 1 kg batch of MA-PLGA-b-PCL-b-PLGA-MA.

| Reagent | Molecular Weight (g/mol) | Molar Ratio | Density (g/mol) | Mass (g) | Volume (mL) | Moles |
|---|---|---|---|---|---|---|
| HO-PLGA-b-PCL-b-PLGA-OH | 6000 | 1 | — | 1000 | — | 0.17 |
| Methacryloyl Chloride (MC) | 104.54 | 3.8 | 1.07 | 66.2 | 61.9 | 0.63 |
| Triethylamine (TEA) | 101.19 | 3.8 | 0.726 | 64.1 | 88.3 | 0.63 |
| Butylated hydroxytoluene (BHT) | 220.35 | ~400 ppm | | 0.45 | | |
| Dichloromethane (DCM) | — | | 0.2 g/mL | — | 5000 | — |

HO-PLGA-b-PCL-b-PLGA-OH was dissolved in anhydrous DCM in a round bottom flask under $N_2$. Triethylamine and a small amount BHT were added the reaction flask and the reaction flask was cooled to 0° C. in an ice water bath. The reaction flask was equipped with a pressure-equalizing addition funnel that was charged with methacryloyl chloride. Once the reaction flask reached 0° C., methacryloyl chloride was added dropwise over 2 hours. The reaction proceeded for 12 h at 0° C. and then 24 h at room temperature. Once complete, the reaction contents were washed with distilled water 2 times to remove the triethylamine hydrochloride salts, saturated $Na_2CO_3$, and dried over magnesium sulfate. The collected and dried DCM layer was dried with rotary evaporation. The final product was characterized with THF GPC, $H^1$ NMR, FTIR, and DSC.

EXAMPLES 4-6

Preparation of a Tri-Arm MA Terminated Polyester Oligomer

These examples describe the preparation of a tri-arm, or star shaped, bioresorbable polyester oligomer. Each arm is terminated with methacrylate. Each arm has a molecular weight of 2 kilodaltons and is a block copolymer of poly(lactide-r-glycolide) (PLGA) and poly(caprolactone) (PCL) with PCL being the core of the oligomer. The PCL is included as 40 wt % of the total MW. The PLGA is a random copolymer of lactide (L) and glycolide (G) with L:G weight ratio of 1:1.

EXAMPLE 4

PCL-3OH Synthesis

Refer to Table 4 for an example of the molar ratios and masses of each reagent used for a 1 kg batch of (PLGA-b-PCL)-3OH synthesis as the next two sections are discussed.

TABLE 4

Example of molar ratios and mass of each reagent needed to synthesize a 1 kg batch of (PCL-b-PLGA)-3OH.

| Reagent | Molecular Weight (g/mol) | Molar Ratio | Density (g/mol) | Mass (g) | Volume (mL) | Moles |
|---|---|---|---|---|---|---|
| Caprolactone (CL) | 114.14 | 22 | 1.03 | 400.0 | 388.4 | 3.50 |
| Trimethylolpropane (TMP) | 134.07 | 1 | 1.08 | 21.4 | 19.8 | 0.16 |
| Stannous Octoate (Sn(Oct)) | 405.12 | $2.38 \times 10^{-3}$ | 1.25 | 0.15 | 0.12 | $3.81 \times 10^{-4}$ |
| D,L-Lactide (L) | 144.13 | 14 | — | 321.4 | — | 2.22 |
| Glycolide (G) | 116.07 | 14 | — | 258.8 | — | 2.22 |

A round bottom flask was dried in a drying oven overnight and cooled under $N_2$ flow to room temperature. Caprolactone and tin octoate were added to the round bottom flask via a glass syringe and syringe needle. The reaction flask contents were heated to 130° C. Meanwhile, trimethylolpropane (TMP) was heated to 130° C. Once preheated, TMP was added to the reaction flask as an initiator and was allowed to react until complete monomer conversion. Monomer conversion was monitored using $H^1$ NMR. The reaction was stopped, and the reaction contents were allowed to cool to room temperature. The (PCL)-3OH was precipitated into cold MeOH from chloroform to obtain a white solid. H1 NMR, DSC, FTIR, and THF GPC were used to characterize (PCL)-3OH.

EXAMPLE 5

(PCL-b-PLGA)-3OH Synthesis (PCL)-3OH and varying amounts of D,L-lactide and glycolide were added into a round-bottom flask under $N_2$ and heated to 140° C. to melt the reaction contents. After melting, the temperature was reduced to 120° C. and stannous octoate was added. The reaction continued with stirring while monitoring the monomer conversion with $H^1$NMR and THF GPC. Once the reaction reaches the desired molecular weight, reaction contents were cooled to room temperature, dissolved in chloroform and precipitated into cold diethyl ether three times. The precipitate was dried under vacuum.

EXAMPLE 6

(PCL-b-PLGA)-3MA Synthesis

Refer to Table 5 for an example of the molar ratio and masses of each reagent used to synthesize a 1 kg batch of (PLGA-b-PCL)-3MA.

(PCL-b-PLGA)-3OH was dissolved in anhydrous DCM in a round bottom flask under N2. Triethylamine (TEA) and a 400 ppm BHT were added the reaction flask and the reaction flask was cooled to 0° C. in an ice water bath. The reaction flask was equipped with a pressure-equalizing addition funnel that was charged with methacryloyl chloride. Once the reaction flask reached 0° C., methacryloyl chloride was added dropwise over 2 hours. The reaction proceeded for 12 h at 0° C. and then 24 h at room temperature. Once complete, the precipitate was removed via vacuum filtration. The filtrate was collected and DCM was removed with rotary evaporation. The resulting viscous oil was dissolved in THF and precipitated into cold methanol. The precipitate was dissolved in DCM and washed with aqueous HCL (3%, 2 times), saturated aqueous sodium bicarbonate solution, and saturated aqueous sodium chloride, then dried over magnesium sulfate. The magnesium sulfate was filtered off via vacuum filtration, and the filtrate was collected. DCM was removed via rotary evaporation and the solid product was collected and characterized with THF GPC, H1 NMR, FTIR, and DSC.

TABLE 5

Example of molar ratios and mass of each reagent needed to synthesize a 1 kg batch of (PLGA-b-PCL)-3MA.

| Reagent | Molecular Weight (g/mol) | Molar Ratio | Density (g/mol) | Mass (g) | Volume (mL) | Moles |
|---|---|---|---|---|---|---|
| (PLGA-b-PCL)-3OH | 6000 | 1 | — | 1000 | — | 0.17 |
| Methacryloyl Chloride (MC) | 104.54 | 4.8 | 1.07 | 83.6 | 78.2 | 0.80 |
| Triethylamine (TEA) | 101.19 | 4.8 | 0.726 | 80.9 | 111.5 | 0.63 |
| Butylated hydroxytoluene (BHT) | 220.35 | ~400 ppm | | 0.47 | | |

TABLE 5-continued

Example of molar ratios and mass of each reagent needed
to synthesize a 1 kg batch of (PLGA-b-PCL)-3MA.

| Reagent | Molecular Weight (g/mol) | Molar Ratio | Density (g/mol) | Mass (g) | Volume (mL) | Moles |
|---|---|---|---|---|---|---|
| Dichloromethane (DCM) | — | 0.2 g/mL | — | — | 5000 | — |

EXAMPLE 7

Difunctional Oligomer Resin Formulation

The following ingredients were mixed together in the following weight percents to provide a light polymerizable resin for additive manufacturing:
(1) 66.2% of the difunctional oligomer prepared in Examples 1-3 above;
(2) 3.5% trimethylol propane triacrylate (TMPTMA) reactive diluent;
(3) 28.4% of N-methyl pyrrolidone (NMP) non-reactive diluent; and
(4) 1.89% of Irgacure® 819 photoinitiator.

EXAMPLE 8

Tri-Arm Oligomer Resin Formulation

The following ingredients were mixed together in the following weight percents to provide a light polymerizable resin for additive manufacturing:
(1) 68.6% of the tri-arm oligomer prepared in Examples 4-6 above;
(2) 29.4% of N-methyl pyrrolidone (NMP) non-reactive diluent; and
(3) 1.96% of Irgacure® 819 photoinitiator.

EXAMPLE 9

Additive Manufacturing and Post-Processing

With resins prepared as described in the examples above, additive manufacturing is carried out on a Carbon Inc. M1 or M2 apparatus, available from Carbon Inc., 1089 Mills Way, Redwood City Calif., 94063 in accordance with standard techniques.

When the resin contains a non-reactive diluent, the objects can experience a global shrinkage upon washing/extraction by the extent of the non-reactive diluent loading amount. Therefore, a dimensional scaling factor is applied to the part .stl file or 3MF file to enlarge the printed part and intentionally account for subsequent shrinkage during post processing steps.

Post processing of the produced parts can be carried out as follows: After removing the build platform from the apparatus, excess resin is wiped from flat surfaces around the objects, and the platform left on its side to drain for about 10 minutes. The objects are carefully removed from the platform and washed in an acetone bath for 30 seconds on an orbital shaker 3 times, followed by 5 minutes of drying after each wash. After the third wash, the parts are allowed to dry for 20 minutes, and then flood cured for 20 seconds per side, in a PRIMECURE™ ultraviolet flood curing apparatus.

Next, residual non-reactive diluent (e.g. N-methyl pyrrolidone) is extracted from the parts by immersing in acetone and shaking at room temperature overnight. The solvent is exchanged once in the middle of the extraction (approximately 8 hours after start). The objects are then removed from the acetone and vacuum dried overnight at 60° C. The parts are then checked for residual NMP and, if no detectable residual, checked for tackiness. If the parts remain tacky, they are then flood cured under nitrogen in an LED based flood lamp (such as a PCU LED N2 flood lamp, available from Dreve Group, Unna, Germany).

EXAMPLES 10-12

Preparation of a Tri-Arm MA Terminated Polyester Oligomer

These examples describe the preparation of a tri-arm, or star shaped, bioresorbable polyester oligomer. Each arm is terminated with methacrylate. Each arm has a molecular weight of 2 kilodaltons and is a block copolymer of poly (L-lactic acid) (PLLA) and poly(caprolactone-r-L-lactic acid) (PCLLA) with PCLLA being the core of the oligomer. The PCLLA is included as 70 wt % of the total MW and the CL:L ratio is 60:40.

EXAMPLE 10

PCLLA-3011 Synthesis

Refer to Table 6 for an example of the molar ratios and masses of each reagent used for a 1 kg batch of (PLLA-b-PCLLA)-3OH synthesis as the next two sections are discussed.

TABLE 6

Example of molar ratios and mass of each reagent needed
to synthesize a 1 kg batch of (PCL-b-PLGA)-3OH.

| Reagent | Molecular Weight (g/mol) | Molar Ratio | Density (g/mol) | Mass (g) | Volume (mL) | Moles |
|---|---|---|---|---|---|---|
| Caprolactone (CL) | 114.14 | 22 | 1.03 | 418 | 405 | 3.66 |
| Trimethylolpropane (TMP) | 134.07 | 1 | 1.08 | 21.4 | 19.8 | 0.16 |

TABLE 6-continued

Example of molar ratios and mass of each reagent needed
to synthesize a 1 kg batch of (PCL-b-PLGA)-3OH.

| Reagent | Molecular Weight (g/mol) | Molar Ratio | Density (g/mol) | Mass (g) | Volume (mL) | Moles |
|---|---|---|---|---|---|---|
| Stannous Octoate (Sn(Oct)) | 405.12 | $2.38 \times 10^{-3}$ | 1.25 | 0.15 | 0.12 | $3.81 \times 10^{-4}$ |
| L-Lactide (L) | 144.13 | 24 | — | 576 | — | 3.99 |

A round bottom flask was dried in a drying oven overnight and cooled under $N_2$ flow to room temperature. Caprolactone, L-lactide and tin octoate were added to the round bottom flask. The reaction flask contents were heated to 130° C. Meanwhile, trimethylolpropane (TMP) was heated to 130° C. Once preheated, TMP was added to the reaction flask as an initiator and was allowed to react until complete monomer conversion. Monomer conversion was monitored using $H^1$ NMR. The reaction was stopped, and the reaction contents were allowed to cool to room temperature. The (PCLLA)-3OH was precipitated into cold MeOH from chloroform to obtain a white solid. H1 NMR, DSC, FTIR, and THF GPC were used to characterize (PCLLA)-3OH.

EXAMPLE 11

(PLLA-b-PCLLA)-3OH Synthesis (PCLLA)-3OH and L-lactide were added into a round-bottom flask under $N_2$ and heated to 140° C. to melt the reaction contents. After melting, the temperature was reduced to 120° C. and stannous octoate was added. The reaction continued with stirring while monitoring the monomer conversion with $H^1$NMR and THF GPC. Once the reaction reached the desired molecular weight, reaction contents were cooled to room temperature, dissolved in chloroform and precipitated into cold diethyl ether three times. The precipitate was dried under vacuum.

EXAMPLE 12

(PLLA-b-PCLLA)-3MA Synthesis

Refer to Table 7 for an example of the molar ratio and masses of each reagent used to synthesize a 1 kg batch of (PLLA-b-PCLLA)-3MA.

(PLLA-b-PCLLA)-3OH was dissolved in anhydrous DCM in a round bottom flask under $N_2$. Triethylamine (TEA) and a 400 ppm BHT were added the reaction flask and the reaction flask was cooled to 0° C. in an ice water bath. The reaction flask was equipped with a pressure-equalizing addition funnel that was charged with methacryloyl chloride. Once the reaction flask reached 0° C., methacryloyl chloride was added dropwise over 2 hours. The reaction proceeded for 12 h at 0° C. and then 24 h at room temperature. Once complete, the precipitate was removed via vacuum filtration. The filtrate was collected and DCM was removed with rotary evaporation. The resulting viscous oil was dissolved in THF and precipitated into cold methanol. The precipitate was dissolved in DCM and washed with aqueous HCL (3%, 2 times), saturated aqueous sodium bicarbonate solution, and saturated aqueous sodium chloride, then dried over magnesium sulfate. The magnesium sulfate was filtered off via vacuum filtration, and the filtrate was collected. DCM was removed via rotary evaporation, and the solid product was collected and characterized with THF GPC, $H^1$ NMR, FTIR, and DSC.

TABLE 7

Example of molar ratios and mass of each reagent needed
to synthesize a 1 kg batch of (PLGA-b-PCL)-3MA.

| Reagent | Molecular Weight (g/mol) | Molar Ratio | Density (g/mol) | Mass (g) | Volume (mL) | Moles |
|---|---|---|---|---|---|---|
| (PLLA-b-PCLLA)-3OH | 6000 | 1 | — | 1000 | — | 0.17 |
| Methacryloyl Chloride (MC) | 104.54 | 4.8 | 1.07 | 83.6 | 78.2 | 0.80 |
| Triethylamine (TEA) | 101.19 | 4.8 | 0.726 | 80.9 | 111.5 | 0.63 |
| Butylated hydroxytoluene (BHT) | 220.35 | ~400 ppm | | 0.47 | | |
| Dichloromethane (DCM) | — | 0.2 g/mL | — | — | 5000 | — |

EXAMPLE 13

Difunctional Oligomer Resin Formulation

The following ingredients were mixed together in the following weight percents to provide a light polymerizable resin for additive manufacturing:

(1) 58.82% of the difunctional oligomer prepared in Examples 10-11 above;

(2) 39.22% propylene carbonate (PC) non-reactive diluent; and (3) 1.96% of Irgacure® 819 photoinitiator.

The foregoing is illustrative of the present invention, and is not to be construed as limiting thereof. The invention is defined by the following claims, with equivalents of the claims to be included therein.

What is claimed is:

1. A resin useful for the additive manufacturing of a flexible or elastic bioresorbable object, comprising:

(a) from 5 percent by weight to 90 percent by weight of (meth)acrylate terminated bioresorbable polyester oligomer;
(b) from 1 percent by weight to 70 percent by weight of non-reactive diluent;
(c) from 0.1 percent by weight to 4 percent by weight of photoinitiator;
(d) optionally, from 1 percent by weight to 50 percent by weight of reactive diluent;
(e) optionally, from 1 percent by weight to 50 percent by weight of filler; and
(f) optionally, from 1 percent by weight to 10 percent by weight of at least one additional cross-linking agent.

2. The resin of claim 1, wherein said oligomer comprises a linear oligomer.

3. The resin of claim 1, wherein said oligomer comprises a branched oligomer.

4. The resin of claim 1, wherein said oligomer comprises degradable ester linkages between constituents selected from caprolactone, lactide, glycolide, trimethylene carbonate, dioxanone, and propylene fumarate monomers in an ABA block, BAB block, CBC block, BCB block, AB random composition, BC random composition, homopolymer, or any combination thereof, wherein:
A=poly(lactide) (PLA), poly(glycolide) (PGA), poly(lactide-co-glycolide) (PLGA), or polypropylene fumarate (PPF),
B=polycaprolactone (PCL), polytrimethylene carbonate (PTMC), or poly(caprolactone-co-lactide) (PCLLA), and
C=polydioxanone (PDX).

5. The resin of claim 1, wherein said oligomer has a molecular weight (Mn) of from 2 kilodaltons to 20 kilodaltons.

6. The resin of claim 4, wherein said oligomer comprises an ABA block, a BAB block, a CBC block, or a BCB block in linear and/or branched form.

7. The resin of claim 6, wherein A is:
(i) poly(lactide);
(ii) poly(glycolide);
(iii) poly(lactide-co-glycolide) containing lactide and glycolide in a molar ratio of (i) from 90:10 to 55:45 lactide:glycolide or (ii) from 45:55 to 10:90 lactide:glycolide;
or any combination of the foregoing.

8. The resin of claim 6, wherein B is:
(i) polycaprolactone;
(ii) polytrimethylene carbonate;
(iii) poly(caprolactone-co-lactide) containing caprolactone and lactide in a molar ratio of 95:5 to 5:95 caprolactone:lactide;
or any combination of the foregoing.

9. The resin of claim 4, wherein:
A has a molecular weight (Mn) of from 1,000 daltons, up to 10,000 daltons; and
B has a molecular weight (Mn) of from 1,000 daltons, up to 10,000 daltons.

10. The resin of claim 1, wherein said non-reactive diluent is selected from the group consisting of dimethylformamide, dimethylacetamide, N-methyl pyrrolidone (NMP), dimethyl sulfoxide, cyclic carbonate, diethyl adipate, methyl ether ketone, ethyl alcohol, acetone, and combinations thereof.

11. The resin of claim 1, wherein said non-reactive diluent is propylene carbonate.

12. The resin of claim 1, wherein said reactive diluent comprises an acrylate, a methacrylate, a styrene, a vinylamide, a vinyl ether, a vinyl ester, polymers containing any one or more of the foregoing, or a combination of two or more of the foregoing.

13. The resin of claim 1, further comprising at least one additional ingredient selected from: pigments, dyes, active compounds or pharmaceutical compounds, detectable compounds, and combinations thereof.

14. The resin of claim 1, further comprising a filler.

15. The resin of claim 1, consisting essentially of:
(a) from 5 percent by weight to 90 percent by weight of a (meth)acrylate terminated, linear or branched, bioresorbable polyester oligomer of monomers in an ABA block, a BAB block, a CBC block, or a BCB block, wherein:
A is poly(lactide) (PLA), poly(glycolide) (PGA), poly(lactide-co-glycolide) (PLGA), or a combination thereof, with said PLGA containing lactide and glycolide in a molar ratio of either 90:10 to 60:40 lactide:glycolide or 40:60 to 10:90 lactide:glycolide, and A has a molecular weight (Mn) of from 1,000 daltons, up to 10,000 daltons);
B is polycaprolactone (PCL, PTMC, PCLLA) and has a molecular weight (Mn) of from 1,000 daltons, up to 10,000 daltons; and
C is polydioxanone (PDX) and has a molecular weight (Mn) of from 1,000 daltons, up to 10,000 daltons and
(b) from 1 percent by weight to 70 percent by weight of propylene carbonate;
(c) from 0.1 percent by weight to 4 percent by weight of photoinitiator,
(d) optionally, from 1 percent by weight to 50 percent by weight of reactive diluent; and
(e) optionally, from 1 percent by weight to 50 percent by weight of filler.

16. The resin of claim 1, consisting essentially of:
(a) from 10 percent by weight to 80 percent by weight of (meth)acrylate terminated, bioresorbable, branched polyester oligomer; wherein said branched oligomer comprises degradable ester linkages between constituents in an ABA block, BAB block, or AB random composition, where A is poly(lactide) or poly(lactide-co-glycolide), B is polycaprolactone or poly(caprolactone-co-lactide), and said oligomer has a molecular weight (Mn) of from 2 to 6 kilodaltons;
(b) from 5 percent by weight to 50 percent by weight of non-reactive diluent selected from the group consisting of N-methyl pyrrolidone (NMP) and propylene carbonate;
(c) from 0.2 percent by weight to 2 percent by weight of photoinitiator;
(d) optionally, from 1 percent by weight to 50 percent by weight of reactive diluent;
(e) optionally, from 1 percent by weight to 50 percent by weight of filler; and
(f optionally, from 1 percent by weight to 10 percent by weight of additional crosslinking agent.

17. A method of making a flexible or elastic bioresorbable object, comprising producing said object by photopolymerizing a resin of claim 1 in the shape of the object.

18. The method of claim 17, further comprising cleaning said object after said producing step.

19. The method of claim 17, further comprising exposing said object to additional light after said producing step to further react unpolymerized constituents therein.

20. The method of claim 17, further comprising extracting residual diluent from said object after said producing step.

21. The method of claim 17, further comprising drying said object to remove extraction solvents therefrom.

22. The method of claim 20, further comprising producing said object in enlarged form to offset shrinkage of said object that occurs during said extracting step.

23. A flexible or elastic bioresorbable object produced by the method of claim 17.

\* \* \* \* \*

UNITED STATES PATENT AND TRADEMARK OFFICE
CERTIFICATE OF CORRECTION

PATENT NO. : 11,466,121 B2
APPLICATION NO. : 17/753415
DATED : October 11, 2022
INVENTOR(S) : Gu et al.

It is certified that error appears in the above-identified patent and that said Letters Patent is hereby corrected as shown below:

In the Specification

Column 3, Line 34: Please correct "(t)" to read --(f)--

Column 8, Line 41: Please correct "polybutylene succinate)" to read --poly(butylene succinate)--

Column 14, Line 50: Please correct "PCLLA-3011 Synthesis" to read --PCLLA-3OH Synthesis--

In the Claims

Column 18, Line 56, Claim 16: Please correct "(f" to read --(f)--

Signed and Sealed this
Seventh Day of March, 2023

Katherine Kelly Vidal
*Director of the United States Patent and Trademark Office*